United States Patent [19]

Klöhn et al.

[11] 4,389,264

[45] Jun. 21, 1983

[54] PROCESS FOR THE MANUFACTURE OF INSULATED PROPELLANT SETS AND OF PROPELLING SETS PROVIDED WITH AN INSULATING ENVELOPE

[75] Inventors: Wolfgang H. R. Klöhn, Pfinztal; Dieter H. Müller, Karlsruhe; Hiltmar A. O. Schubert, Walzbachtal, all of Fed. Rep. of Germany

[73] Assignee: s.a. PRB, societe anonyme, Belgium

[21] Appl. No.: 234,604

[22] Filed: Feb. 17, 1981

[30] Foreign Application Priority Data

Feb. 21, 1980 [DE] Fed. Rep. of Germany ....... 3006418

[51] Int. Cl.³ .............................................. C06B 45/12
[52] U.S. Cl. .......................................... 149/14; 149/6; 149/7; 149/15; 149/109.6; 264/3 R
[58] Field of Search ................ 149/14, 15, 6, 7, 109.6; 264/3 R

[56] References Cited

U.S. PATENT DOCUMENTS

| | | | |
|---|---|---|---|
| 3,539,377 | 11/1970 | Steinle | 149/7 |
| 3,954,526 | 5/1976 | Mangum et al. | 149/7 |
| 4,124,418 | 11/1978 | Reed et al. | 149/7 |

*Primary Examiner*—Stephen J. Lechert, Jr.
*Attorney, Agent, or Firm*—Bacon & Thomas

[57] ABSTRACT

Process for the manufacture of insulated propellant sets for base-bleed gas generators, said propellant set consisting of a propellant containing one or more solid substances, at least one of which is an oxidant, and a binder being a thermoplastically deformable elastomer, characterized thereby that the propellant is introduced into an insulating envelope, which as an essential component contains a thermoplastically deformable elastomer suited for the binder, and is forced into the envelope at increased temperature.

10 Claims, No Drawings

PROCESS FOR THE MANUFACTURE OF INSULATED PROPELLANT SETS AND OF PROPELLING SETS PROVIDED WITH AN INSULATING ENVELOPE

This invention relates to a process for the manufacture of insulated propellant sets for base-bleed gas generators, said propellant sets consisting of a propellant containing one or more solid substances, at least one of which is an oxidant, and a binder being a thermoplastically deformable elastomer, and also relates to a propellant set provided with an insulating envelope for base-bleed gas generators, said propellant set consisting of a propellant containing a binder and one or more solid substances at least one of which is an oxidant.

With base-bleed gas generators are meant gas-producing charges of projectiles, especially artillery projectiles, which are disposed at the bottom part or base of such a projectile and by burning of a propellant release gases that fill up the vacuum forming at the tail of the projectile during its flight in order to eliminate the base drag exerted by the vacuum on the projectile (Belgian patent specification No. 834.903).

The propellant sets for such generators, which in general are cylindrical and have an axial combustion channel, should be insulated at their external surfaces in order that an orderly burn-up from the inside of the channel to the outside be guaranteed, since the generator on burning up runs the risk of being destroyed at its external walls too.

According to the known processes for making insulated propellant sets for base-bleed gas generators the external surfaces of the preformed propellant sets, at which surfaces any combustion has to be avoided, are coated with liquid curable polymers such as terminally hydroxylated or terminally carboxylated polybutadienes, liquid polyurethanes, epoxy resins or unsaturated polyesters.

Thereupon the propellant set and the coating serving as an insulating envelope are cured jointly. The known propellant sets provided with an insulating envelope have in the latter polybutadienes, polyurethanes, epoxy resins or polyesters as essential components.

A special disadvantage in this known process is that the adhesion of the insulation to the propellant or to the propellant set is very poor. In order to increase it, adhesion aids have been added, which, however, makes the process more expensive. Nevertheless, no satisfying adhesion is achieved. The deficient adhesion involves that the propellant set on burning up is not consumed from inside to outside, but that flames strike into the outer areas of deficient adherence and so can effect a destruction of the insulating envelope whereby the whole generator of the projectile runs the risk of exploding because the whole surface area of combustion in enlarged thereby and the produced gases cannot flow off sufficiently through the channel any longer.

Moreover, the process of casting an envelope on the preformed propellant set is quite expensive as only separate areas can be provided with the insulating material at every turn and the propellant set has to be turned for the insulation of other faces. Finally, the materials for insulating envelopes used up to now have a low resistance to heat, since only polymers with low molecular weights can be used in the liquid processing.

So, it is an object of the present invention to provide a process for making insulated propellant sets and such sets provided with an insulating envelope wherein the abovesaid disadvantages are avoided and especially wherein a proper adherence and a strong bond between insulating envelope and propellant set as well as an appropriate stability against burn-up are obtained.

According to the invention the propellant is introduced into an insulating envelope, which as an essential component contains a suitable thermoplastically deformable elastomer for the binder, and is pressed into the envelope at a higher temperature, and also contains a propellant set provided with an insulating envelope which is characterized thereby that the binder consists of a thermoplastically deformable elastomer, that the insulating envelope contains the same type of thermoplastically deformable elastomer as an essential component, and that the binder of the propellant set and the insulating envelope are closely connected to each other.

According to the invention the insulating envelope is thus not cast on the preformed propellant set. The insulating envelope according to the present invention itself is made of granulated basic material, in that the latter either is first introduced in a mould for the insulating envelope and is compressed therein at a higher temperature so as to form the insulating envelope, or is plasticized and worked into the insulating envelope by injection moulding. After cooling of the mould the insulating envelope made is take out from it and introduced in the compression mould for the propellant set in which the propellant set provided with an insulating envelope is made according to the process of the present invention.

According to a first embodiment the propellant can be placed into the insulating envelope as a preformed propellant set so that—as is known by itself from the state of the art—the preformed propellant set, in contradistinction to the state of the art, is provided with its insulating envelope by compression at increased temperature according to the present invention.

According to a strongly preferred embodiment of the present invention, however, the propellant is fed into the insulating envelope in the form of a granulate. In addition, the separate process step of a separate formation of the propellant set is left out advantageously as the basic material of the propellant itself is directly introduced in the prepressed insulating envelope and is compressed therein so as to form the propellant set.

Although the propellant set in itself could be made in one single piece it is usual to compose it of two equal cylinder halfs.

Of course this is also possible according to the present invention so that with the term propellant set either an entire cylindrical propellant set together with its axial gas channel or a longitudinal half of a propellant set cylinder having a longitudinal groove with semicircular section is meant.

The compression results in an intimate bond between the binder of the propellant set and the insulating envelope containing the same type of thermoplastically deformable elastomer as main component, in that irreversible changes of position of the molecules are achieved by the influence of the compression forces in the transition range in such a way that parts of the molecules of the binder penetrate in the insulating envelope and conversely.

The essential advantage is thus especially the fact that an intimate bond between propellant set and insulating envelope is achieved. Further it has been observed that the insulating envelope in comparison with known insulations of propelling sets possesses a markedly higher resistivity against fusing and burning up.

In addition to the mentioned main components of the insulating envelope used according to the present invention, viz. a thermoplastically deformable elastomer which according to a strongly preferred embodiment is an orderly three-block elastomer, especially an orderly copolymer of butadiene and styrene or of isoprene and styrene, the insulating envelope can contain small amounts of noncombustible organic or inorganic fillers, e.g. inorganic fillers such as quartz meal, silica, talcum, calcium carbonate or carbon black. By means of these fillers the thermal stability of the insulating envelope during burnup is still enhanced with respect to the thermal stability that has already been ameliorated by the application of the embodiment according to the present invention. A further advantage of the invention is that a high degree of automation of the process can be reached on the basis of the insulating envelope of the present invention, wherein especially the injection of the propellant into the envelope can be carried out automatically in series production, whereas insulating according to known techniques allows only a small degree of automation.

Other advantages and characteristics of the present invention appear from the claims and the description below wherein an embodiment of the invention is disclosed detailedly.

According to an embodiment of the present invention the insulating envelope essentially has the form a cylindrical envelope with an internal total length of 130 mm, a diameter of 120 mm, and a thickness of the insulating envelope of 2 mm. For the outlet of burning gases of the propellant set the insulating envelope of it at least at one of the end faces of the cylindrical jacket has a symmetrical central opening with a diameter of 43.5 mm. As propellant sets are usually composed of two cylinder halfs, each of them showing a recess or groove completing to the channel and having a semicircular section, the insulating envelope for such parts of propellant sets can be formed of two suitable and separately made cylindrical shells.

The insulating envelope according to one embodiment of the present invention shows a copolymer of butadiene and styrene or of isoprene and styrene as an essential component. Further it contains small amounts of silica, which serve as a non-combustible filler and increases the thermal stability of the insulating envelope during the later burning of the propellant set.

According to a preferred embodiment of the process according to the present invention for manufacturing insulated propellant sets or propellant sets jacketed with insulating envelopes for base-bleed generators, one of the above-described insulating envelopes of the present invention in the form of a cylindrical shell having at at least one end face a semicircular opening with the area of the cylindrical surface is laid in a compression mould. Then a propellant granulate, which also contains a copolymer of butadiene and styrene or of isoprene and styrene is poured in the cylindrical shell. Thereupon the whole is heated to about 120° C. and the granulate is pressed into place at this temperature at a pressure of 20 MPa.

The said binder component of the propellant granulate and the material of the insulating envelope softening in this operation combine excellently in this compression step, so that an intimate bond forms between insulating envelope and forced in propellant.

After cooling, the insulated semicylindrical part of the propellant set is taken out from the compression mould and introduced with a corresponding semicylindrical counterpart at the bottom of the projectile. It has been seen in target practice that on using a propellant set provided with an insulating envelope according to the present invention, which completely corrodes or burns when it has been made as usual, is only slightly charred at some places of its internal side, whereas otherwise it was left as a continuous jacket, especially with completely intact outside, although the wall thickness of the insulating envelope of the present invention was smaller than that of the known insulating envelopes.

The characteristics of the present invention disclosed in the foregoing description and in the claims can be essential separately as well as in arbitrary combinations for the realization of the invention in its different embodiments.

What I claim is:

1. Process for the manufacture of insulated propellant sets for base-bleed gas generators comprising introducing a propellant containing one or more solid substances, at least one of which is an oxidant, and a binder comprising a thermoplastically deformable elastomer, into an insulating envelope, which contains a thermoplastically deformable elastomer, and forcing said propellant into the envelope at elevated temperature.

2. Process according to claim 1, wherein the propellant is fed into the insulating envelope in the form of a granulate.

3. Process according to claim 1, wherein the propellant is placed into the insulating envelope in the form of a preformed propellant set.

4. Process according to claims 1, 2 or 3, wherein heating at 100° to 140° C. occurs at least during compression.

5. Process according to claim 4, wherein compression occurs at 120° C.

6. Process according to claims 1, 2 or 3, wherein the step of forcing in the propellant into the insulating envelope is carried out at a pressure of 10 to 50 MPa.

7. Process according to claim 6, wherein the propellant is forced into the insulating envelope at 20 MPa.

8. Propellant set for base-bleed gas generators provided with an insulating envelope, said propellant set consisting of a propellant containing a binder and one or more solid substances, at least one of them being an oxidant, wherein the binder consists of a thermoplastically deformable elastomer, said insulating envelope containing a thermoplastically deformable elastomer, such that the binder of the propellant set and the insulating envelope are closely bonded together.

9. Propellant set according to claim 8, wherein the thermoplastically deformable elastomer is an orderly three-block elastomer.

10. Propellant set according to claim 9, wherein that the three-block elastomer is an orderly copolymer of butadiene and styrene or of isoprene and styrene.

* * * * *